United States Patent

Stwiorok et al.

[11] Patent Number: 4,481,912
[45] Date of Patent: Nov. 13, 1984

[54] DEVICE FOR CAMSHAFT CONTROL

[75] Inventors: Andreas Stwiorok, Cologne; Dieter Stojek, Bergisch-Gladbach; Reinhold Blauhut; Burkhard Brandner, both of Werdohl; Manfred Knuefelmann, Duesseldorf, all of Fed. Rep. of Germany

[73] Assignee: Firma Atlas Fahrzeugtechnik GmbH, Werdohl, Fed. Rep. of Germany

[21] Appl. No.: 396,265

[22] Filed: Jul. 8, 1982

[30] Foreign Application Priority Data

Jul. 14, 1981 [DE] Fed. Rep. of Germany ....... 3127766

[51] Int. Cl.³ .............................................. F01L 1/34
[52] U.S. Cl. ............................................... 123/90.15
[58] Field of Search ................... 123/90.15, 90.17, 501

[56] References Cited

U.S. PATENT DOCUMENTS

| 2,191,459 | 2/1949 | Duncan . | |
|---|---|---|---|
| 3,682,152 | 8/1972 | Muller-Berner . | |
| 3,815,564 | 6/1974 | Suda et al. | 123/501 |
| 3,978,829 | 9/1976 | Takahashi et al. | 123/90.17 |
| 4,142,483 | 3/1979 | Ironside . | |
| 4,265,200 | 5/1981 | Wessel et al. | 123/501 |
| 4,305,352 | 12/1981 | Oshima et al. | 123/90.15 |
| 4,335,689 | 6/1982 | Abe et al. | 123/339 |

FOREIGN PATENT DOCUMENTS

| 2257381 | 11/1972 | Fed. Rep. of Germany . | |
| 2525746 | 1/1976 | Fed. Rep. of Germany . | |
| 2842154 | 4/1979 | Fed. Rep. of Germany . | |
| 2909803 | 9/1979 | Fed. Rep. of Germany . | |
| 2133288 | 11/1972 | France . | |
| 11321 | 1/1977 | Japan | 123/90.15 |
| 1395027 | 5/1975 | United Kingdom . | |

Primary Examiner—William R. Cline
Assistant Examiner—Peggy A. Neils
Attorney, Agent, or Firm—Bacon & Thomas

[57] ABSTRACT

A device for the angular adjustment of a camshaft of a combustion engine according to speed and load conditions and to the angular position of the camshaft with respect to a driving wheel being controlled by an adjustable mechanism. The technical problem is the angular adjustment of the single or multiple camshafts with respect to the crankshaft according to speed and load conditions. Tooth pulses, or counting pulses, corresponding to the angular position of the crankshaft (2) and reference pulses corresponding to a particular angular reference position (singular tooth) are generated by a transducer, or pulse generator, controlled by the toothed ring associated with the crankshaft and the ignition circuit (13). An address counter (10) is reset by the reference pulses and incremented by the tooth pulses so that the output of the counter provides digital address signals corresponding to the actual angular position of the crankshaft (2). The output signals of the address counter and digital signals corresponding to load conditions are input to a correction processor with memory, (20) the output of which provides a camshaft adjustment signal. During pre-set engine operational periods, a buffer memory (21), controlled by the tooth-pulse time base signal, stores an adjustment signal used as a camshaft correcting variable, which is then delayed under asynchronous clocking and fed into an electromechanical control device (FIG. 3) which effects a rotary-then-linear displacement of a control member (31) and subsequently an angular corresponding displacement of the camshaft(s) to the correcting variable.

8 Claims, 3 Drawing Figures

DEVICE FOR CAMSHAFT CONTROL

BACKGROUND OF THE INVENTION

1. Field of the Invention

A device for the angular adjustment of a camshaft(s) of a combustion engine according at least to speed and load conditions and to the angular position of the camshaft with respect to the engine crankshaft. In this way, camshaft timing may be advanced or retarded dynamically thus altering the torque characteristics of the engine on a continuous basis. Furthermore, if two separate camshafts—one intake, one exhaust—are independently alterable, then valve overlap timing may also be dynamically controlled.

2. Description of the Prior Art

In general, the camshafts of a combustion engine are coupled to the crankshaft by a toothed belt and therefore they are driven synchronously with the crankshaft. As a result of this the opening phase of the intake and exhaust valves as well as the overlap angle are constant. This is especially true in the case of a single camshaft containing both intake and exhaust lobes. So, these values can only be adapted to an average value. As is known, the optimum state for the overlap angle changes depending on speed, on load, and on temperature in the combustion chamber: the greater the speed, the greater the overlap required to maximize engine torque.

In the patent application DE-OS No. 29 09 803 there has been described a device of the type mentioned at the beginning. A helical bushing within a helical gear is controlled by centrifugal force whereby the angular position of the camshaft with respect to the crankshaft is adjusted.

U.S. Pat. No. 4,305,352 Oshima, et al. shows a device for camshaft control with an epicyclic gear to adjust the camshaft. A control device not described in detail provides the correcting variables.

A device for camshaft control according to DE-OS No. 25 25 746 also comprises a planet gear for adjusting the camshaft, the control input of the gear being connected with a stepping motor. The instantaneous angular position is continuously compared with the set value. The stepping motor is controlled according to the deviation. It is not described in this application in which way the set values are deduced.

This invention differs from the prior art in a way not obvious in that the digital values of speed and load are evaluated in a digital process, stored values of the angular adjustment being pre-assigned to the digital input data.

SUMMARY OF THE INVENTION

It is the object of the invention to design a device for camshaft control relative to the crankshaft so that set values of the angular adjustment of the camshaft(s) are derived from the actual measured parameters such as speed, load, and others in a digital process. In particular, the adjustment of advance/retard and the overlap angle is hereby made possible with the following combination of elements, processes, and interrelationships:

(a) tooth pulses, or counting pulses, corresponding to an angular frequency of the crankshaft and reference pulses corresponding to an angular reference position on the crankshaft are generated by a pulse generator controlled by a toothed ring coupled to the crankshaft;

(b) an address counter is reset by the reference pulses and incremented by the tooth pulses so that the output of the address counter provides digital address signals corresponding to the actual angular position of the crankshaft;

(c) the output signals of the address counter and digital signals relating to load conditions are stored in a correction data processor with memory, the output of which provides a 4-bit correction signal for the adjustment of each of the two camshafts or an 8-bit signal for a single camshaft;

(d) toward the end of each operational period every correction signal is stored temporarily into a buffer memory clocked by time base signal derived from the counting pulses;

(e) subsequently every correction signal is shifted out of the buffer into a delay memory which is clocked to release its data according to an independent time base signal calculated to correspond to one operational period of the engine; finally, (f) the load-dependent correction signal is fed into a control device effecting a linear displacement of a control member and then a rotary displacement of the camshaft(s).

Hereby a precise angular adjustment of the camshaft is made possible. In particular, it is possible to adjust the crank-offset (single cam) or the (dual cam) so that the performance of the engine under low load conditions, especially when running with no load, is improved. Hereby the efficiency, the engine ouput, and the exhaust gas quality are improved; moreover, the engine will run quieter. It is possible to store a great number of correction data. For example, 1024 correction values for 64 speed intervals and 16 load intervals may be stored in memory without any difficulties. Even twice the number of correction values may be stored. Because the correction is more important in the lower speed range, the lower fifth of the total speed range may be separated into 32 intervals, and the upper four fifths into another 32 intervals the total number of intervals being 64. The camshaft angle is adjustable within ±40° related to the crankshaft angle. Hereby overlap angles of up to 90° can be effectuated when running dual camshafts separately operating the intake and exhaust valves of the engine.

Furthermore, the invention provides that the correction data processor contains correction signals in a memory device (e.g., ROM) depending at least on load and speed. Hereby the correction processor can be fed like a matrix by speed address signals and by load signals.

Furthermore, the invention provides, for example, that the 8-bit correction signal is separated into two partial 4-bit signals assigned to the respective camshafts for intake and exhaust valve control. Thus, it is possible to adjust the intake and exhaust valves separately, which means a higher degree of control for the (dual-cam) engine's efficiency.

Furthermore, the invention provides that the control device has an adjusting wheel rotatably supported by a threaded member, the adjusting wheel having an outer toothed ring driven by one or several motors, and that the adjusting wheel is coupled to an adjusting member adjustable in axial direction. Hereby it is possible to convert a rotary correction motion into a linear adjusting motion and ultimately to a related rotary adjusting motion for each individual camshaft.

Furthermore, the invention provides that a shoulder of the adjusting wheel is coupled to a screw-like multi-turn potentiometer providing a signal corresponding to the angular position of the camshaft(s) as well as the axial position of the adjusting wheel. Hereby the actual position is converted into a voltage which can be fed back for the purpose of dynamic regulation.

Furthermore, the invention provides that the motors driving the adjusting wheel have pinions the axial tooth lengths of which correspond to the linear adjusting motion of the adjusting wheel so that the adjusting wheel is always coupled to the driving pinions without the need for additional measures.

Furthermore, the invention provides a regulator circuit for the adjusting device the set-value of which is an analog signal corresponding to the correction signal and the feedback value of which is the output signal of the multi-turn potentiometer. Hereby it is possible to influence the engine characteristic control and to optimize its regulation through this servosystem.

Furthermore, the invention provides an after-running control circuit to reset the address counter after the interruption or breaking of the ignition circuit and to act as an auxiliary ignition power circuit for the duration of a few revolutions of the crankshaft. This guarantees that the camshafts are always reset to their initial positions so that no additional electric energy is required for the driving motors of the camshaft adjustment when starting the combustion engine.

BRIEF DESCRIPTION OF THE DRAWINGS

An embodiment of the invention is illustrated in the following, referring to the drawings in which.

DESCRIPTION OF PREFERRED EMBODIMENTS

Figure 1:
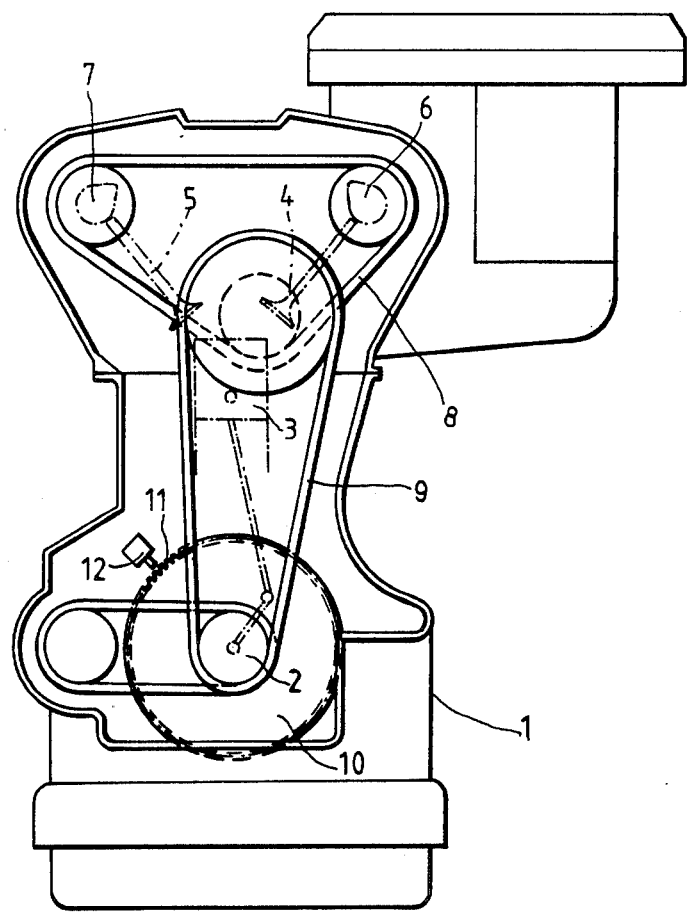
FIG. 1 shows a schematic front view of a combustion engine.

FIG. 1 shows the front view of a combustion engine 1. Several pistons 3 moving in cylinders are coupled to a crankshaft 2 in a well known way. The cylinders are not shown in detail. Each cylinder has an intake valve 4 and an exhaust valve 5. The fuel may be carburetted or injected according to the Otto cycle or Diesel cycle. The intake valves 4 and the exhaust valves 5 are separately and respectively controlled by camshafts 6, 7. The camshafts 6 and 7 are driven from the crankshaft 2 by toothed belts 8 and 9 so that the motion of the camshafts 6 and 7 corresponds with that of the crankshaft 2 permitting a synchronous timing of the intake valves 4 and the exhaust valves 5.

Figure 2:
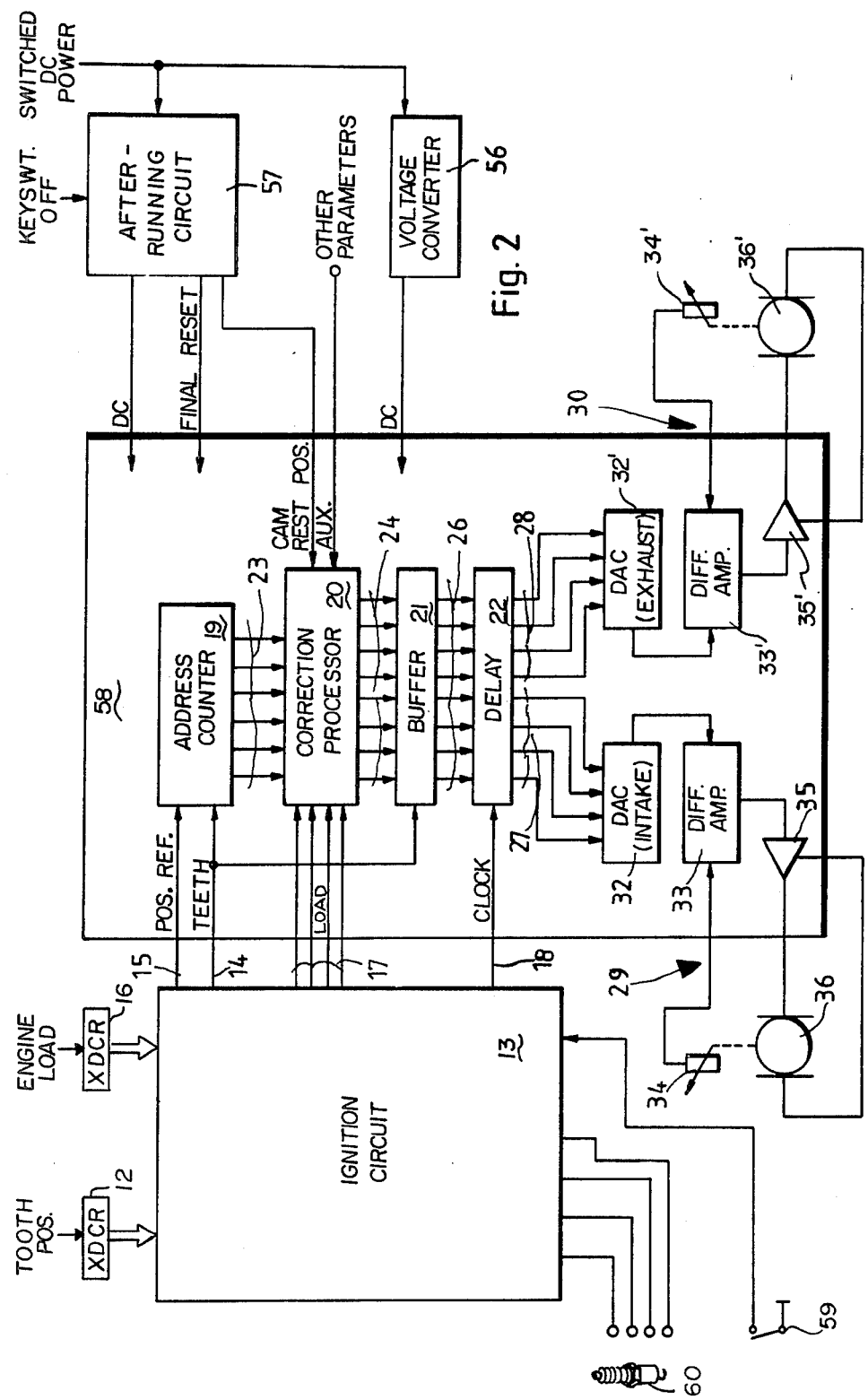
FIG. 2 shows the electronic part of the camshaft control device.

The crankshaft is coupled to a dampener wheel or flywheel 10 and ultimately to a ring with teeth 11. These teeth 11 cause the transducer 12 to generate so called tooth pulses, or counting pulses. Consequently, the tooth pulses indicate the actual angular position of the flywheel 10. In addition, one of the teeth 11 is a reference tooth for generating a reference pulse in the transducer 12. Thus, this element 12 may be referred to as the reference pulse generator as well. Of course, the reference tooth may be differentiated from the rest of the teeth. According to FIG. 2, the tooth pulses are processed and formed in an ignition circuit 13. The formed tooth pulses and the reference pulses are available at the tooth pulse output 14 and the reference-pulse output 15 respectively where these feed the camshaft control circuit 58. In addition, a load sensor, or transducer, 16 is provided; this load sensor may be a pressure or vacuum sensor in the intake manifold or a torquemeter. The load conditions can be indicated by a four-bit load signal on the output lines 17. Of course, other parametric inputs are possible as well. In addition, the ignition circuit 13 provides a time base signal (from an internal clock) at the output 18; the beginning of the time base signal is coincident with the reference pulse and the duration of this signal is a fraction of the period of revolution of the flywheel at maximum engine speed. Naturally, the ignition circuit 13 also makes use of an input trigger signal from breaker points 59 or an equivalent device. It should also be understood that the ignition circuit 13, like any other, serves primarily to provide timed "spark signals" to igniters 60 or coil and distributor or comparable arrangement (not shown). Yet, these aspects are not essential to the invention The reference pulse output 15 and the counting pulse output 14 are connected to an address counter 19 which is reset by the reference pulse. The address counter 19 sends, for example, a six-bit address signal into the output lines 23, the signal indicating the actual position of the crankshaft 2. The six-bit address signal and the four-bit load signal are fed into a matrix-like correction processor 20 the 1024 memory cells of which contain that number of correction values for adjusting the camshaft with respect to the crankshaft. The total speed range and the load range are separated into 64 speed intervals and 16 load intervals. The intervals may be dimensioned linear or nonlinear. It is advisable to separate the low speed range into smaller intervals because a more exact correction is required in this range. Preferably the lower fifth of the total speed range is separated into 32 speed intervals. Of course it is possible to provide more storage locations and therefore more correction values. An eight-bit correction signal is thereby made available at the output lins 24 of the correction processor 20.

Further memory locations of the correction processor 20 are addressable through the auxiliary signal line 25; these additional locations may contain correction data assigned to different operating temperatures, different fuel mixtures or other parameters. These signals are digitally encoded by and derived in the ignition circuit 13 based on inputs from otther appropriate transducers which might reasonably be contemplated.

The output lines 23 are connected to a temporary storage, or buffer memory, 21 clocked by the pulse output 14. The output lines 26 of the temporary storage 21 are connected to a delay memory 22 clocked by the ignition circuit's own time base signal on line 18. When the trailing edge of the time base signal occurs, the value at the output of the temporary storage 21 is transferred into the delay memory 22 to remain there for the duration of one operational period of the crankshaft 2. In order to have the possibility of controlling the two camshafts separately, the 8-bit output of the delay memory 22 is separated into two partial groups of control lines: The intake valves are controlled by the lines 27, the exhaust valves are controlled by the lines 28. So a four-bit correction signal is available for either camshaft 6, 7, providing 16 correcting steps. The camshafts can be adjusted by ±40° relative to the crankshaft. Thereby, an intake-exhaust overlap angle of up to 90° can be effectuated.

Control devices 29 and 30 are provided for both camshaft 6 and 7 respectively. The control devices 29 and 30 comprise D/A converters 32 and 32' to convert the four-bit correction signal of the digital set-value of the camshaft angle into an analog signal. These signals along with the signals from the multi-turn potentiometers 34 and 34', indicating the actual angular position of the camshafts, are both fed into the two inputs of the corresponding differential amplifiers 33 and 33'. The differential signals are fed into motor control circuits 35 and 35' controlling a set of driving motors 36 and 36'. The control characteristic may be adjusted as required in order to avoid oscillation.

Figure 3:
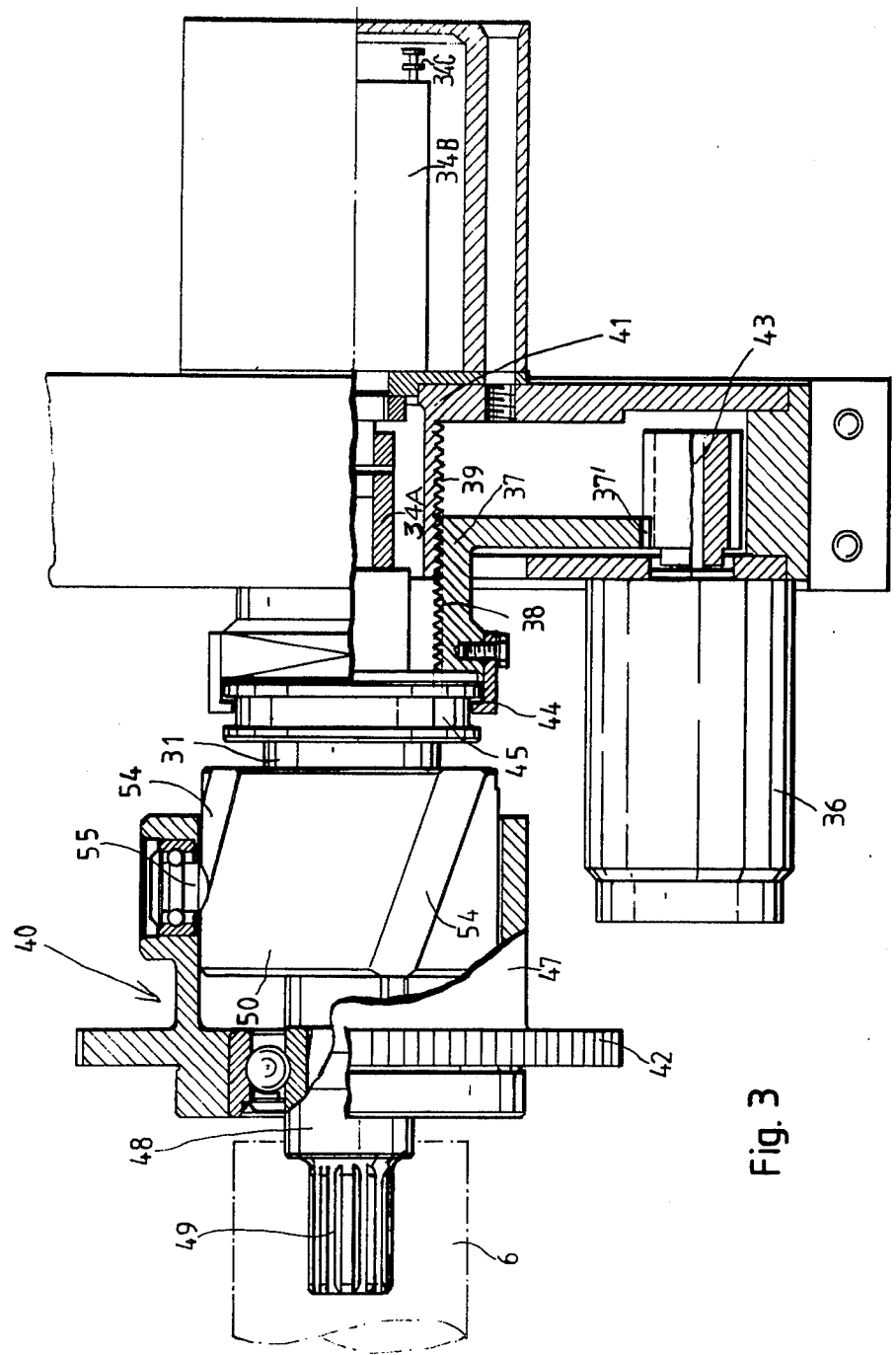
FIG. 3 shows a cutaway and sectional drawing of the gear for adjusting open camshaft.

Referring now to FIG. 3. Three driving motors 36, for instance, are coupled to each camshaft 6 for sufficient torque. Only one of the set of driving motors 36 is shown in the drawing. The three motors 36 drive a toothed ring 37' of an adjusting wheel 37 with an inside thread 38; the adjusting wheel 37 is rotatably supported by a stationary bearer 41 with an outside thread 39 and can be moved along the axis of the bearer. Each driving motor 36 bears a pinion 43 the axial length of which is equal to the length of the outside thread 39 so that the adjusting wheel 37 is always coupled to the pinions 43, regardless of its actual position. The adjusting wheel 37 is connected with a claw 44 coupled to a collar 45 of an adjusting member 31 which can be moved in the axial direction. Additionally, the central region of the adjusting wheel 37 is coupled to the movable core 34A of the multi-turn potentiometer, whose base can 34B remains fixedly mounted to the bearer 41. The end, ungrounded terminal 34C of the potentiometer is the point of electrical connection to the amplifier 33. Thus, the movable core 34A always follows the wheel 37 in its linear travel; the action is screw-like in character and many rheostats and related devices are well known to work in this manner.

The adjustable mechanism 40 in the form of a helical gear is a superimposing gear. An annular housing 47 bears the driving wheel 42. The annular housing 47 rotatably supports a quill shaft 48 coupled to the camshaft 6 by a carrier 49. The quill shaft 48 guides a bushing 50 movable in the axial direction. The bushing 50 is attached to the adjusting member 31. Profiled pilots 55 catch several helical guides 54 arranged in the peripheral surface of the bushing 50. The linear correction motion of the adjusting member 31 is transferred to the bushing 50. Hereby the bushing 50 rotates within the annular housing 47 and effects an angular rotation of the quill shaft 48. Therefore, the angular position of the quill shaft 48 relative to the annular housing 47 is changed so that the angular position of the camshaft 6 relative to the crankshaft 2 is corrected. Hereby the opening phase of the valves coupled to the camshaft is changed. It is therefore possible to change the intake-exhaust overlap angle by rotating both camshafts 6, 7.

Returning to FIG. 2, the power supply of the device consists of a DC voltage converter 56 to adapt the engine's electrical source to the requirements of the control circuit 58.

In addition, the invention includes an after-running control circuit 57 activated after the shut-down of the ignition circuit in order to stop the engine. When the ignition is manually deactivated (key), this circuit 57 resets the address counter 19 and functions as an auxiliary ignition circuit for the duration of a few revolutions of the crankshaft. Hereby, the camshafts are returned to the initial position when the engine is stopped. When starting the combustion engine, the camshafts are then adjusted starting from this initial (rest) position, and the driving motors 36 do not load the power supply system when the engine is started.

We claim the followed:

1. A device for the angular positional adjustment of the camshaft of an internal combustion engine with respect to the crankshaft of that engine, according to measured speed and load conditions and predetermined correctional data for optimizing engine torque, including:
   (a) a toothed ring coupled to the crankshaft of said internal combustion engine where said ring contains one reference tooth which is fixed and permanently associated with one position of the crankshaft;
   (b) a transducer cooperating with said toothed ring and therewith functioning as a pulse generator producing tooth, or counting, pulses corresponding to every sensed tooth and one reference pulse corresponding to the sensed reference tooth;
   (c) a transducer arranged to sense the dynamic load on said engine;
   (d) an ignition circuit which controls said engine and which
      (1) receives all inputs and/or pulses from said transducers,
      (2) receives normal ignition trigger signals,
      (3) outputs spark or equivalent signals,
      (4) contains an independent outpulsing time base device, or clock, synchronized with the beginning of each operation cycle of the engine,
      (5) serves to outpulse counting and reference pulses as received by an appropriate transducer or pulse generator connected thereto, and
      (6) serves to outpulse digital signals derived from the engine-load input transducer;
   (e) an address counter which is connected to said ignition circuit and which is incremented by its counting pulses and reset by its reference pulses so that the digital output of said address counter consists of address signals corresponding to the actual angular position of said crankshaft;
   (f) a correction processor connected to said address counter for receiving said digital address signals and further connected to the ignition circuit's digital engine-load output whereby a digital camshaft correction signal is produced and output;
   (g) a temporary storage buffer which is connected to and arranged to receive the digital output signal of the correction processor and which is further clocked by the ignition circuit via connection to the counting, or tooth, pulse output line of said ignition circuit in such a way as to release the stored camshaft correction signal toward the end of each engine operational cycle as given by said counting pulses;
   (h) a delay memory connected to receive said output correction signal of the storage buffer and further connected to said independent clock output line of the ignition circuit whereby said correction signal is not released until the expiration of each engine operational period as determined by said independent time base; and
   (i) an electromechanical servo-type camshaft control device including a digital-to-analog converter connected to the output of the delay memory and a camshaft-adjustment mechanism including means to first effect a feedback-sensed llinear adjustment motion and then a feedback-sensed angular adjustment motion according to the information provided in said digital camshaft correction signal.

2. Device for camshaft control according to claim 1, wherein the correction processor contains engine-load-dependent and engine-speed-dependent correction data in a memory.

3. Device for the control of a dual-camshaft internal combustion engine according to claim 1 or 2, said engine including intake and exhaust valves controlled by said camshafts, wherein said camshaft correction signal is separated into two partial signals addressed or assigned to the two camshafts at the delay memory output for controlling the intake and exhaust valves respectively and independently from one another in such a way as to vary dynamically the intake-exhaust valve overlap in each cylinder of said engine.

4. Device for camshaft control according to claim 1 or 2, wherein said servo-type control device has an adjusting wheel rotatably supported by a threaded member, and wherein said adjusting wheel has an outer toothed ring driven by at least one parallel-axis rotary motor, and furter wherein said adjusting wheel is also coupled to an adjusting member adjustable in the axial direction.

5. Device for camshaft control according to claim 4, wherein a shoulder of the adjusting wheel is coupled to a multi-turn potentiometer including means for providing an analog signal corresponding to the axial position of the adjusting wheel.

6. Device for camshaft control according to claim 4, wherein one or several motors have pinions, the axial tooth length of which corresponds to the adjustable linear travel of the adjusting wheel.

7. Device for camshaft control according to claim 5, wherein a regulator servo-type circuit is further included, the set value of which is an analog signal corresponding to the digital camshaft correction signal and the feedback-value of which is the analog output signal of said multi-turn potentiometer.

8. Device for camshaft control according to claim 1, wherein an after-running control circuit is further included and includes means to reset said address counter after the interruption of the ignition circuit, to trigger the appropriate input of said correction processor, and to act as an auxiliary ignition power circuit for the duration of the few revolutions of said crankshaft necessary to bring the camshaft into a position optimal for restarting said engine from a cold, rest state.

* * * * *